United States Patent [19]

Beckers et al.

[11] 4,183,968
[45] Jan. 15, 1980

[54] METHOD FOR PRODUCTION OF CANDIES FROM A STRAND OF CONFECTION

[75] Inventors: Hans Beckers; Paul-Werner Jung, both of Mönchen-Gladbach; Herbert Bovians, Viersen, all of Fed. Rep. of Germany; Johann M. Heyer, deceased, late of Viersen, Fed. Rep. of Germany, by Adele Heyer, heir; Hans P. Heyer, heir, Viersen; Marlene Wanders, heir, Beuggen, both of Fed. Rep. of Germany

[73] Assignee: Robert Bosch GmbH, Stuttgart, Fed. Rep. of Germany

[21] Appl. No.: 837,338

[22] Filed: Sep. 28, 1977

[30] Foreign Application Priority Data

Sep. 28, 1976 [DE] Fed. Rep. of Germany ....... 2643855

[51] Int. Cl.² .............................................. A23G 3/00
[52] U.S. Cl. .................................. 426/512; 264/157; 264/320; 425/235
[58] Field of Search ............... 425/335, 330, 297, 298, 425/299, 235; 264/297, 280, 163, 157, 280, 320; 426/517, 512

[56] References Cited

U.S. PATENT DOCUMENTS

1,967,565  7/1934  Thurlings .............................. 425/235

FOREIGN PATENT DOCUMENTS

1053913  3/1959  Fed. Rep. of Germany ........... 425/235
1271927  8/1961  France ..................................... 425/235
 309046  1/1930  United Kingdom ..................... 425/235
 856718 12/1960  United Kingdom ..................... 425/235

*Primary Examiner*—William R. Briggs
*Attorney, Agent, or Firm*—Edwin E. Greigg

[57] ABSTRACT

The invention relates to an apparatus for the continuous forming of high density, seamless candies from a strand of confectionary material provided with a viscous filling. Candy blanks are first cut from an incoming soft strand and then pressed into candy pieces of the desired shape. The apparatus includes cooperative complementally formed pairs of separating teeth as well as pairs of members for shaping the candy and stamping chambers arranged in a rotating rotor.

1 Claim, 2 Drawing Figures

METHOD FOR PRODUCTION OF CANDIES FROM A STRAND OF CONFECTION

BACKGROUND OF THE INVENTION

The invention relates to a method and apparatus for continuously stamping pieces of candy from traveling lengths of confectionary material and comprises rotating laterally open chambers into which is arranged to project, from opposite sides thereof, axially disposed co-rotating stamping dies. The final shaping of the candy blank which has been advanced longitudinally into the chamber is accomplished by the continuous engagement of the shaping dies as they are admitted into the chamber where the stamping and formation of the candy piece takes place. The device also comprises camways and a roller pressure element which is correlated therewith.

German Pat. Nos. 2,456,480 and 1,053,913 disclose devices in which a first separating ring having outwardly projecting separating teeth, and a second separating ring that surrounds the first and is arranged eccentrically thereto and which further includes inwardly projecting separating teeth is adapted to squeeze off blanks from the soft strand as the separating teeth come together. Thus, the pillow-shaped blanks are pushed by one of the forming dies into the forming chamber which is arranged so that it is open on both sides and the candy blanks are compressed between the two sets of forming dies. In this manner the forming dies form the opposite sides of the candy, and the wall of the forming chamber forms the surrounding surface or perimeter of the candy.

By use of the known apparatus, however, it has been determined that during production of candies with thin sugar coatings and viscous fillings, the seams that are formed by line form pressing during separation of the blanks are not always properly sealed thereby causing the fillings to initially leak. Furthermore, the difficulties experienced by use of this apparatus are not overcome by the finish stamping of the candy. This loss of filling causes the apparatus to become dirty, leading to dissatisfactory operation of the machine and naturally leads to sticky, low quality candies.

Thicker seams on the candy blanks can be achieved when the separating elements compress the squeezed seam over a longer period of time, as, for example, has become known by another device revealed in Austrian Pat. No. 170,992. This device includes a rotor, having alternating depressions and separating teeth, as well as covers having sides and separating teeth that can rotate against the rotor, thus forming, together with the depressions in the rotor, stamping chambers. The teeth separate blanks or candy pieces from the traveling confectionary strand which are then formed and stamped in the stamping chambers which comprise the teeth and depressions. Because the stamping chambers of this known device are comprised of several parts with separating seams, flash overflow is produced at the surrounding surface of the candy during stamping, and this flash overflow can lead to problems in the wrapping of the candy on high speed wrapping machines and also gives the candy an unfinished appearance.

OBJECT AND SUMMARY OF THE INVENTION

Accordingly, the principal object of the present invention is to feed a confectionary strand into a zone where it is grasped by a pair of stamping dies which preform the confection into its final shape preparatory to the wrapping operation.

Another object of the present invention is to arrange the stamping dies so that they reciprocate toward and away from each other under the influence of camways with one of the dies adapted to enter a first chamber and pass therethrough into a second chamber formed by the separating teeth that sever the confection into blanks.

Still another object of the invention is to provide a method and apparatus that can produce an improved candy product which will be practically free of seams and have no flash overflow particularly where the confectionary strand includes a liquid or syrupy core.

Further advantages of the present invention are that the candies produced in the machine are subjected to longer periods of compression and especially in that the flat separating seams are not torn off by the stamping dies during pre-forming, but rather are cut off by stacked separating elements. Also, where caramels are being produced, the pre-formed hard caramels are held in their correct position in the one-piece stamping chamber by form-fit so that a crooked position caused by a jostling is avoided.

Yet another object of the present invention is to provide a smooth guiding of the movable separating elements and the forces produced by the friction between the separating elements and the control curve are constrained without loading the rotating bearings.

The invention will be better understood as well as further advantages thereof become more apparent from the ensuing detailed description taken in conjunction with the drawings.

DESCRIPTION OF THE PREFERRED EMBODIMENT

Figure 1:
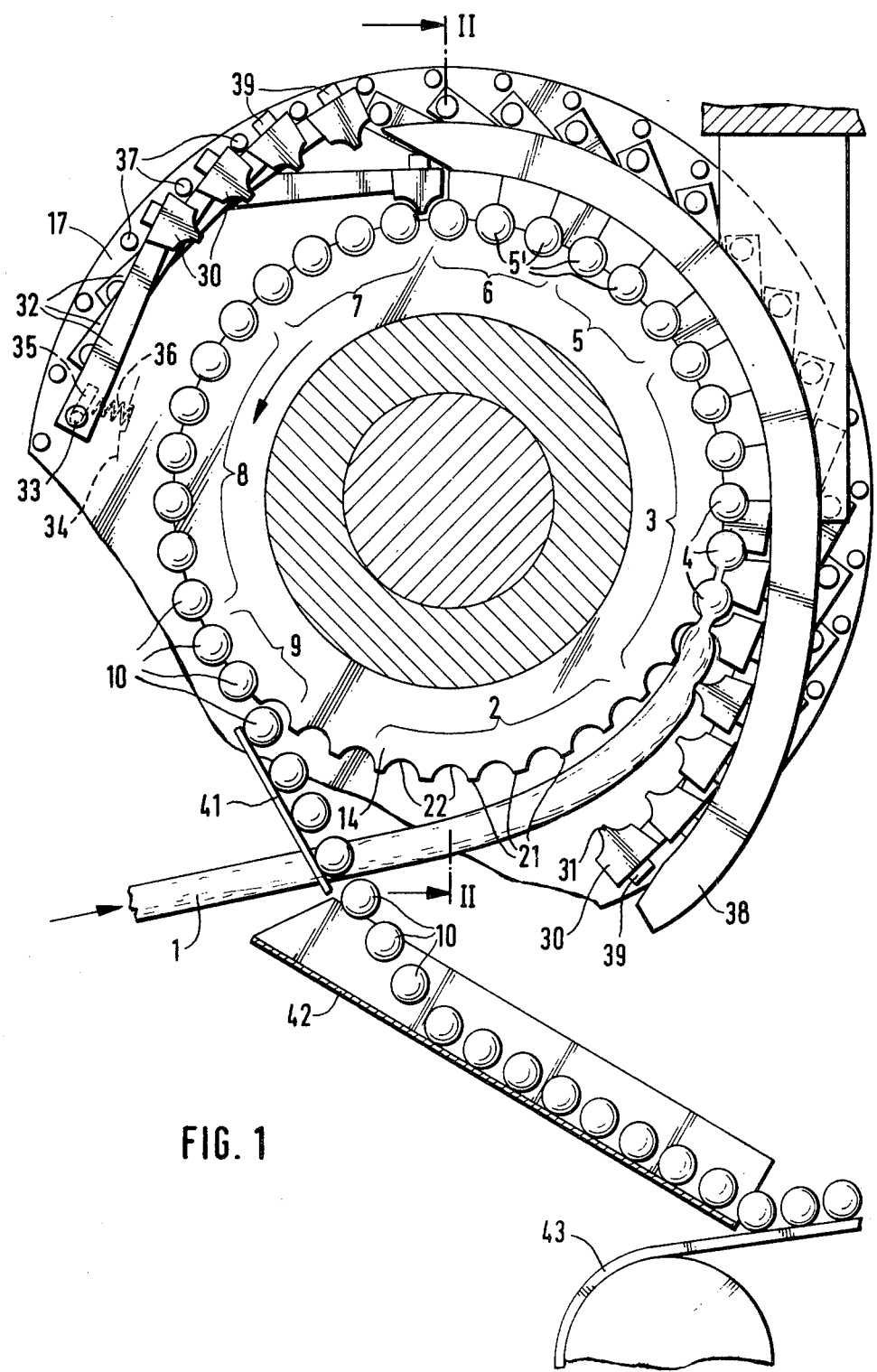
FIG. 1 is a device for pre-forming and stamping of candies and is shown in cross section.
Figure 2:
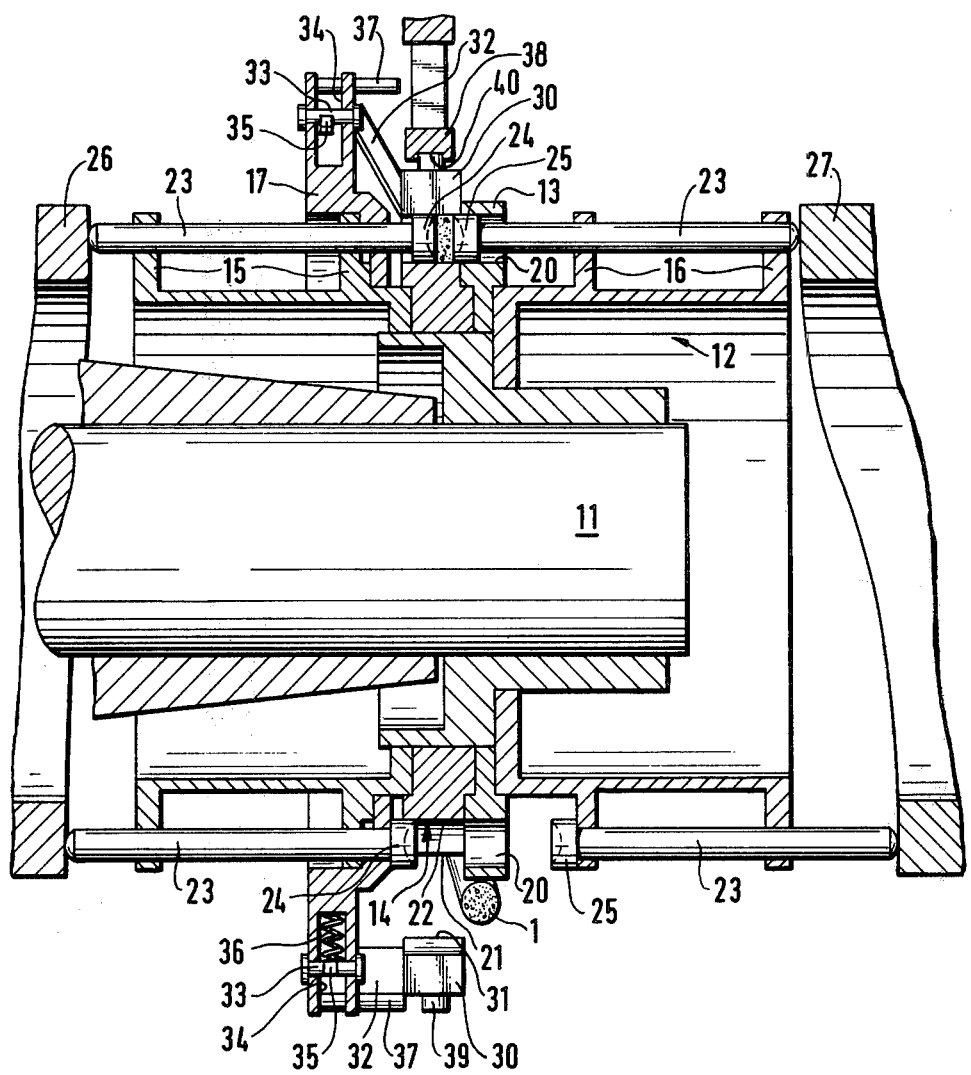
FIG. 2 is the device according to FIG. 1 in vertical section along the line II—II of FIG. 1.

Turning now to the drawings, a drum 12 is placed on a horizontal shaft 11, along with a stamping chamber ring 13, a tooth ring 14, two carrier ring pairs 15,16 and a further ring 17. In the stamping chamber ring 13 through bores are arranged to extend and these serve as stamping chambers 20, each of which are equally spaced around a circle. The axes of these bores extend parallel to the axis of rotation of the stamping ring 13, and their surrounding walls are seamless. The toothed ring 14, which is adjacent to the stamping chamber ring 13, has radially outwardly extending separating teeth having ridged areas 21, whose interengaging sides along with the proximal stamping chambers 20 form aligned depressions 22. Complementally formed stamping dies 24, 25 are disposed on opposite sides of the stamping chambers 20 in the carrier rings 15, 16 so that they can be reciprocated by their shafts 23. Each pair of stamping dies 24, 25 are arranged to cooperate with one of the stamping chambers 20. The sliding movement of the stamping dies 24, 25 is controlled by two oppositely disposed stationary cam surfaces 26, 27, against which the terminus of the shafts 23 of the stamping dies 24, 25 are arranged to slide under pressure from spring means, not shown. In the area of the highest pressure of the stamping dies 24, 25, the cammed areas 26, 27 each have a roller located in a recess. The cam 26 that is arranged on the side of the toothed ring 14, is formed so that the stamping dies 24 lying on the side of the toothed ring 14 are pushed from the area of depressions 22 spaced from the stamping chamber ring 13, through the depressions 22 and the stamping chambers 20 and are then moved back. The other stamping dies 25, which lie on the side of the stamping chamber ring 13 are moved by the cam 27 in such a manner, that they are pushed from a position spaced from the stamping chamber ring 13 into and through the stamping chambers 20 and into the depressions 22 of the toothed ring 14, and then moved back.

To separate the pillow-shaped blanks of candy 4 from the traveling, soft confectionary strand 1, forming elements 30 with separating teeth 31 that extend toward the separating teeth 21 of the toothed ring 14, can be moved against the individual separating teeth 21 of the toothed ring 14. The sides of each separating tooth 31 are formed so that the proximal sides of two movable separating teeth 31, together with an associated depression 22 of the toothed ring 14, form an enclosed chamber covering the adjacent stamping chamber 20. This occurs when the movable separating teeth 31 lie against the opposite separating teeth 21 of the toothed ring 14. One side of a forming element 30 having separating teeth 31 is attached on one end of a side bar 32. The other end of each side bar 32 carries a bolt shank 33, which is rotatably mounted in bores whose axes are parallel to the axis of rotation of the drum 11 and the ring 17. A relatively small lever 35 is attached to the shank of each bolt 33 which passes through a groove 34 of the ring 17. A spring 36 supported at the base of the groove 34 is arranged with the opposite end thereof in abutting relation with each lever 35. By means of these springs 36, the forming elements 30 are urged away from the toothed ring 14, against stops, which are formed by a rod 37 that is provided in the ring 17.

The pressing operation to form the candy pieces and the advancement and retraction of the forming elements 30 toward and away from the toothed ring 14 is controlled by a stationary arcuately shaped element 38 as the drum 11 rotates. It is to be noted from FIG. 1 that the arcuate element 38 is arranged in alignment with the toothed ring 14 and the candy forming elements 30. The candy forming elements 30 travel with their outwardly extending surfaces in sliding contact with the inner arcuate surface of the curved element 38 as they revolve with the drum 11, and then continue along element 38 until its terminal point is attained. In order that the side bars 32, the bolts 33, and their support bores that are provided in the ring 17 need absorb no side forces from the offset position of the forming elements 30, but rather only the pulling forces corresponding to the friction, and in addition achieve an even, smooth running of the forming elements 30 during the candy piece forming, the elements 30 are provided with pin means 39 that protrude from their rear surface and engage in a groove 40 in the curved element 38 and are thus guided thereby.

The apparatus operates in the following manner:

The filled confectionary strand 1 to be processed is guided into the lower area 2 of the apparatus tangentially to the toothed ring 14, at which time the forming elements 30 are then swung away from the toothed ring 14. In the area 3, as the rotation of the drum continues its counter-clockwise movement the confectionary strand 1 is pressed against the ridges of the teeth 21 of the toothed ring 14 carried by the drum by the synchronously revolving complementally formed teeth 31 of the candy shaping elements 30, as controlled by the arcuate curve 38. In this manner the complementally formed pairs of teeth 21, 31 squeeze the strand 1 at equally spaced intervals and divide it into pillow-shaped blanks 4 with each having seamed zones. The pressure is maintained over a distance of about ten blank lengths or at least through the areas denoted 5 and 6 so that the seams are properly welded and free of leaks. While the separating teeth 31 of the candy shaping elements 30 are pressed against the separating teeth 21 of the toothed ring 14, the associated stamping dies 25 are pushed from the side of the stamping chamber ring 13 through the first aligned stamping chambers 20 and partially into the second chambers formed by the sides of the separating teeth 31 and the depressions 22 of the toothed ring 14. While one stamping die 25 is penetrating such a chamber, the complementally formed confronting stamping die 24 is simultaneously moved further into this chamber. In this manner both stamping dies 24, 25 compress the flat seams of the blanks 4, and press the blank 4 in the area 5 into a finished candy 10 in the form that was previously approximated by the pre-formed blanks 5'. During the period that the stamping dies 24, 25 of a pair are held at a constant distance, they are moved in the area 6 into the associated stamping chamber 20 of the stamping chamber ring 13. In this method, the preformed blanks 5' are form-fittedly tightened in the proper position in the stamping chamber 20. The preformed blanks 5' are compressed further in the area 7, in that the one stamping die 25 remains motionless relative to the other stamping die 24, while this stamping die 24 is pushed somewhat farther into the stamping chamber 20, thereby stamping a candy 10 that is free of flash overflow. The candy shaping element 30 is simultaneously moved back into its position away from the toothed ring 14. In the area 8, the one stamping die 25 is pulled out of the stamping chamber 20 into its original position. The other stamping die 24 is also moved out of contact with the just finished candy 10, so that pressures in the candy 10 can be neutralized during the period of time when the candy 10 is supported on its circumference on the seam-free wall of the stamping chamber 20. Finally, the finished candy 10 is pushed by stamping die 24 out of the stamping chamber 20 in the area 9, where it then falls onto a slide 41, thence onto a chute 42 that terminates in proximity to a conveyor 43.

The foregoing relates to a preferred exemplary embodiment of the invention, it being understood that other embodiments and variants thereof are possible within the spirit and scope of the invention, the latter being defined by the appended claims.

What is claimed and desired to be secured by Letters Patent of the United States is:

1. A method of forming candy blanks from a cylindrical confectionary strand having a liquid filling comprising the steps of, moving a pair of separating teeth from a disengaged open position into an engaged operative position to form a blanking chamber for severing and forming a separate candy blank having seamed zones from the confectionary strand, moving a pair of axially aligned stamping dies towards each other against opposite sides of a candy blank in said blanking chamber to compress the flat seams of said blank and to preform said blank, moving said pair of stamping dies in the same direction into an associated laterally open one-piece stamping chamber with said preformed candy blank retained therebetween to form-fittedly tighten said blank, moving said pair of stamping dies closer together with said candy blank retained therebetween in said associated stamping chamber to form a finished candy blank free of flash overflow, moving said pair of stamping dies apart with said finished candy blank disposed in said associated stamping chamber and ejecting said finished candy blank from said associated stamping chamber.

* * * * *